April 29, 1952 M. W. KENNEY 2,594,565

CABINET FOR SOUND REPRODUCING EQUIPMENT

Filed Sept. 23, 1949

INVENTOR
Mahlon W. Kenney
BY
John F. Eakins
ATTORNEY

Patented Apr. 29, 1952

2,594,565

UNITED STATES PATENT OFFICE 2,594,565

CABINET FOR SOUND REPRODUCING EQUIPMENT

Mahlon W. Kenney, Oak Park, Ill., assignor to J. P. Seeburg Corporation, Chicago, Ill., a corporation of Illinois Application September 23, 1949, Serial No. 117,388

4 Claims. (Cl. 175—298)

This invention relates to cabinets for sound reproducing equipment, such as phonographs, radio receivers, television receivers and other equipment including electronic and electrical devices mounted on chassis.

The principal object of the invention is to provide an improved mounting and housing for such chassis.

In accordance with the present invention, I mount the chassis in a wall of the cabinet so that the open side of the chassis, normally the bottom of the chassis, is substantially flush with the door, locating the major portion of the chassis and the equipment carried on the upper side thereof located within the cabinet. I prefer to provide a removable cover, suitably of sheet metal to enclose the open end of the chassis. By merely removing this cover, the resistors, condensers and other elements located inside the chassis are readily available for servicing or adjustment. Preferably, the wall on which the chassis are mounted is in the form of a hinged door so that by merely swinging the door outwardly, the tubes and equipment carried on the inner side, normally the upper side, of the chassis are available for service.

The invention will more readily be understood from the following description of a preferred embodiment thereof, taken in conjunction with the accompanying drawing in which.

Figures 1, 2, 3:
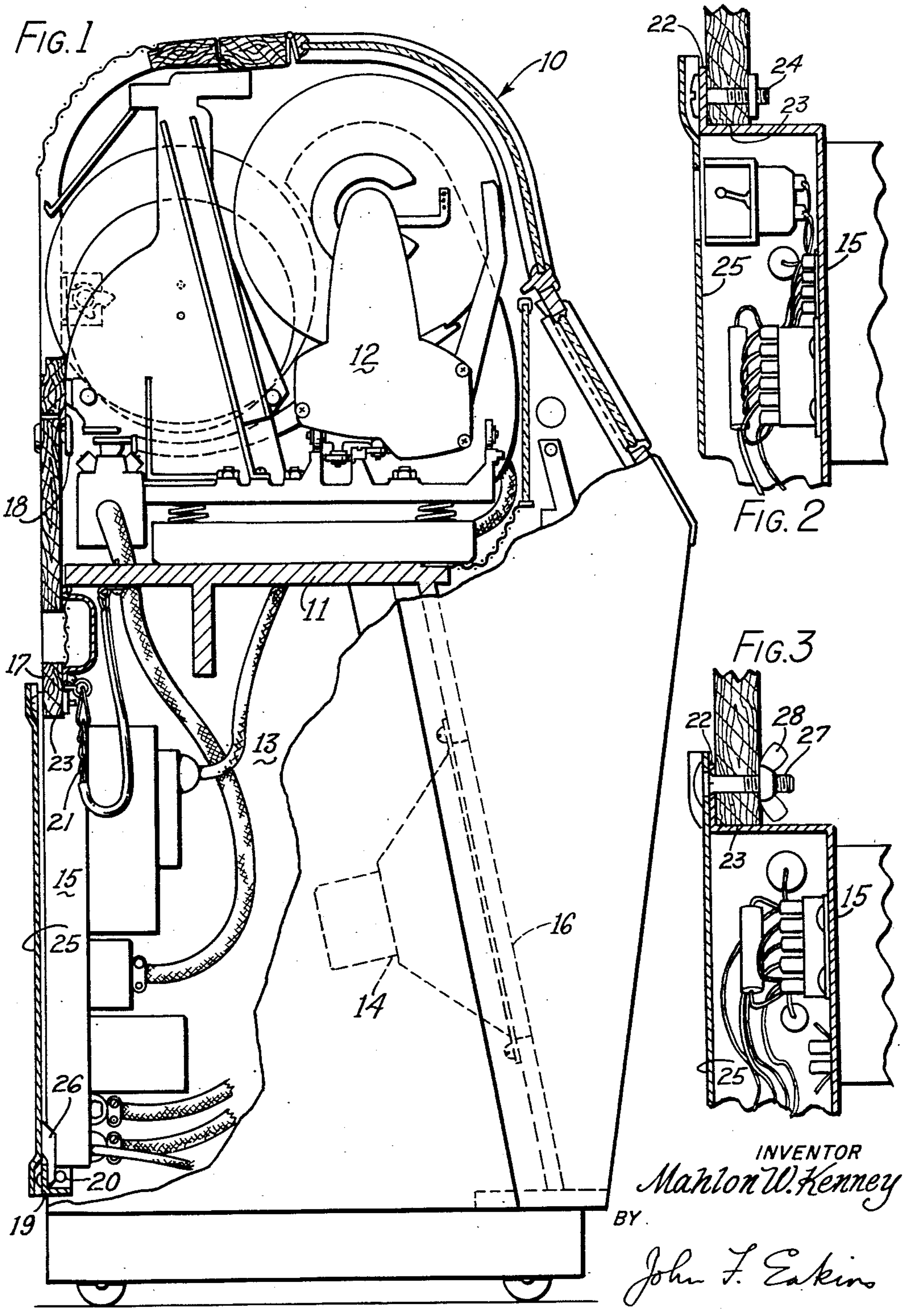
Figure 1 is a side elevation, partly broken away, of a coin controlled phonograph embodying my invention.
Fig. 2 is a fragmentary sectional view showing the manner in which a chassis is mounted on the door of the phonograph cabinet.
Fig. 3 is a similar view showing the manner in which the chassis cover is retained in place.

Referring to the drawing, the cabinet illustrated is the coin controlled phonograph described and claimed in my co-pending application Serial No. 117,387, filed September 23, 1949. The cabinet as a whole is designated by the reference number 10. The cabinet comprises a shelf 11 which supports a phonograph mechanism 12. The chamber 13 within the cabinet and below the shelf 11, includes the speaker 14 and one or more chassis 15. The speaker 14 is mounted in a sounding board 16, which extends almost across the front of the lower part of the cabinet and forms the front wall of the chamber 13. The rear wall of the chamber 13 is constituted by a door 17 which is normally locked in vertical position by one or more locks 18. The lower end of the door 17 is mounted on an angle iron transverse member 19 and is pivotally mounted on the cabinet by trunnions 20. A chain 21 secured to the door 17 and to the shelf 11 enables this door to be swung outwardly about its trunnions 20 about 45°.

Electronic and electrical equipment for the phonograph is carried by the chassis 15. Such equipment includes the amplifier, parts of the coin control and selector mechanisms and stepping mechanism for receiving remote control selecting signals, transformers and so forth. In the present machine, two such chassis are provided. Each chassis 15 is provided with upper and lower flanges 22 so that they may be mounted in an opening 23 in the door 17, by means of bolts 24. The open outer sides of the chassis, normally their bottoms, are enclosed by a cover 25, which may suitably be a sheet of metal. The cover 25 is provided near its lower edge with lugs 26 which engage the vertical flange of the angle iron 19. The upper edge of the door is removably secured to the door 17 by means of bolts 27 and wing nuts 28, as best seen in Fig. 3. Of course, any readily removable form of attachment may be employed if desired. Since the present embodiment of the invention is concerned with a cabinet which must be protected from unauthorized interference, the wing nuts are located on the inner side of the door and can only be reached after the door locks 18 are opened.

It will be understood that the bottom wall of the chamber 13 and the door 17 are provided with suitable mesh cover openings (not shown) to provide for the proper baffling of the speaker 14.

In the event that service is required for the equipment on the inner side of the chassis, the locks 18 are unlocked on the door 17 which is swung outwardly about its trunnions 20 into its oblique position, rendering such equipment available for service. In the event that the components within the chassis require service, the door 17 is partially opened, the wing nuts 28 and the cover 25 are removed, the door is closed and the serviceman may sit on a stool and do the necessary work inside the chassis. Thus, all the electrical and electronic mechanisms mounted on the chassis are very readily available for normal service.

Having thus described my invention, I declare that what I claim is:

1. A cabinet for sound reproducing equipment having a generally vertical door pivotally mounted on the cabinet to swing outwardly, a box-like chassis having an open side and carrying electronic and electrical elements on both sides of its side opposite said open side, said door having an opening and said chassis being mounted on said door with its open side registering with said opening, and a readily removable cover over said opening and said open side whereby the electronic and electrical elements within the chassis are readily available from the exterior of said cabinet for adjustment and replacement by removing said cover and the electronic and electrical elements on the exterior of said chassis are readily available for adjustment and replacement by moving said door to open position.

2. A cabinet for sound reproducing equipment having a generally vertical door pivotally mounted on the cabinet to swing outwardly about an axis adjacent its lower edge, means limiting the outward movement of the door to a height suitable for working on the inside of the door, a box-like chassis having an open side and carrying electronic and electrical elements on both sides of its side opposite said open side, said door having an opening and said chassis being mounted on said door with its open side registering with said opening, and a readily removable cover over said opening and said open side whereby the electronic and electrical elements within the chassis are readily available from the exterior of said cabinet for adjustment and replacement and the electronic elements on the exterior of said chassis are readily available for adjustment and replacement by moving said door to its open position.

3. A cabinet for sound reproducing equipment having a generally vertical door pivotally mounted on the cabinet to swing outwardly, a box-like chassis having an open side and carrying electronic and electrical elements on both sides of its side opposite said open side, said door having an opening and said chassis being mounted on said door with its open side registering with said opening, a readily removable cover over said opening and said open side whereby the electronic and electrical elements within the chassis are readily available from the exterior of said cabinet for adjustment and replacement by removing said cover and the electronic and electrical elements on the exterior of said chassis are readily available for adjustment and replacement by moving said door to open position, a lock for said door and readily removable means on the inner side of the door for holding said cover in normal position.

4. A cabinet for sound reproducing equipment having a generally vertical door pivotally mounted on the cabinet to swing outwardly about an axis adjacent its lower edge, means limiting the outward movement of the door to a height suitable for working on the inside of the door, a box-like chassis having an open side and carrying electronic and electrical elements on both sides of its side opposite said open side, said door having an opening and said chassis being mounted on said door with its open side registering with said opening, a readily removable cover over said opening and said open side whereby the electronic and electrical elements within the chassis are readily available from the exterior of said cabinet for adjustment and replacement by removing said cover and the electronic and electrical elements on the exterior of said chassis are readily available for adjustment and replacement by moving said door to open position, a lock for said door and readily removable means on the inner side of the door for holding said cover in normal position.

MAHLON W. KENNEY.

REFERENCES CITED

The following references are of record in the file of this patent:

UNITED STATES PATENTS

| Number | Name | Date |
|---|---|---|
| 1,692,064 | Trogner | Nov. 20, 1928 |
| 1,693,854 | Minott | Dec. 4, 1928 |
| 2,145,798 | Merkel | Jan. 31, 1939 |
| 2,178,220 | Blancha | Oct. 31, 1939 |
| 2,185,562 | Nielsen | Jan. 2, 1940 |
| 2,337,159 | Friedl | Dec. 21, 1943 |